(12) United States Patent
Potter (10) Patent No.: US 8,593,008 B2
(45) Date of Patent: Nov. 26, 2013

(54) VARIABLE VANE VERTICAL AXIS WIND TURBINE

(76) Inventor: Noel Richard Potter, Woods Cross, UT (US)

(*) Notice: Subject to any disclaimer, the term of this patent is extended or adjusted under 35 U.S.C. 154(b) by 228 days.

(21) Appl. No.: 12/471,837

(22) Filed: May 26, 2009

(65) Prior Publication Data

US 2010/0084863 A1   Apr. 8, 2010

Related U.S. Application Data

(60) Provisional application No. 61/102,652, filed on Oct. 3, 2008.

(51) Int. Cl.
*F03D 9/00* (2006.01)
(52) U.S. Cl.
USPC ............................................. 290/55; 290/44
(58) Field of Classification Search
USPC ...................... 290/55, 44; 416/119
See application file for complete search history.

(56) References Cited

U.S. PATENT DOCUMENTS

| | | | | |
|---|---|---|---|---|
| 4,299,537 A * | 11/1981 | Evans | ............................ | 416/119 |
| 4,659,940 A * | 4/1987 | Shepard | ............................ | 290/55 |
| 5,193,978 A * | 3/1993 | Gutierrez | ............................ | 416/24 |
| 5,518,367 A * | 5/1996 | Verastegui | ............................ | 416/119 |
| 6,394,745 B1 * | 5/2002 | Quraeshi | ............................ | 415/4.1 |
| 6,589,017 B1 * | 7/2003 | Solheim | ............................ | 416/87 |

* cited by examiner

*Primary Examiner* — Nguyen N Hanh (57) ABSTRACT

An embodiment of a vertical axis wind turbine (VAWT) with a turbine shaft for transmitting mechanical power. Coupled to the turbine shaft is a support structure with a vane rotatably coupled to the support structure at a vane shaft. The vane rotates the vane shaft, support structure and the turbine shaft around the center of the turbine shaft when the vane is acted upon by the wind. A centrifugal compensation rod is connected to the vane. The centrifugal compensation rod counteracts the centrifugal forces acting upon the vane as the vane rotates about the center of the turbine shaft. Embodiments of the vertical axis wind turbine increase the efficiency of the wind turbine by reducing wind resistance. Some embodiments develop power when the vanes move into the wind instead of simply reducing drag on the side of the turbine that moves into the wind.

20 Claims, 14 Drawing Sheets

Prior Art

FIG. 1

Prior Art

VARIABLE VANE VERTICAL AXIS WIND TURBINE

CROSS-REFERENCE TO RELATED APPLICATIONS

This application claims the benefit of U.S. Provisional Application No. 61/102,652, filed on Oct. 3, 2008, which is incorporated by reference herein in its entirety.

BACKGROUND OF THE INVENTION

Wind turbines have been identified as one of the important ways to generate power from a renewable energy source. Many wind turbine designs have been developed over the last 200 years. The most common type in use commercially today is the horizontal-axis wind turbine (HAWT). The HAWT is generally placed in areas that experience almost continuous wind. The HAWT have propeller blades that turn when the wind blows and the large commercial versions have propeller blades that are as long as 250 feet and the generator sits 650 feet off of the ground. The propeller blades are connected to a shaft that turns a generator which then produces electrical power that is feed into a commercial power grid.

Wind turbine farms have been developed across the world in the last few decades. The wind turbine farms generally use HAWTs to generate power. While the HAWTs are relatively efficient they have their own set of unique problems. It is common to see a wind farm with over 100 wind turbines with less than half of them generating power when the wind is blowing. Most of the problems arise from having the generator mechanism so far off the ground. When a HAWT needs repair it requires large expensive equipment and a skilled technician to repair it. Because of the repair expense, a HAWT often goes without maintenance until enough HAWTs need repair to justify the expense of bringing in a large lift and a technician to repair them. Some of the very large HAWTs have a staircase or elevator built into them so that a technician can get to the working mechanism without a crane. This significantly adds to the cost of the device.

Vertical-axis wind turbines (VAWTs) are another type of wind turbine, which have been around for hundreds of years. While the most common VAWT is named after Finnish engineer Sigurd J. Savonius (circa 1922), there is record of a horizontal wind turbine of the Savonius type being built in 1745 in Furstenburg, Germany by Johann Ernst Bessler. The Savonius VAWT is one of the simplest of wind turbines. The advantage of the Savonius VAWT is that the design allows for placing the power generator that is connected to the VAWT near the ground. Because the axis is vertical and the mechanical power can be transmitted from the top of a tower to the ground level using a vertical shaft. The VAWT does not have to be placed hundreds of feet off of the ground because it does not have large rotating propeller blades. The maintenance of the VAWT is much easier and much less expensive than the maintenance of a HAWT. Another advantage of the Savonius VAWT is that the Savonius VAWT works no matter which direction the wind blows from.

Because of its design, the Savonius VAWT does not need to be aligned with the wind, as is required of a HAWT, in order to capture the wind energy. Thus, in gusty wind conditions where the wind is constantly changing directions, The Savonius VAWT works more effectively that the HAWTs. While there are many locations where there is enough wind on an ongoing basis to justify installing a wind turbine in a commercial or residential setting, placing a HAWT on the top of a building or home that would protrude 100 feet or more above a building or home would be unsightly and difficult to maintain and difficult to receive regulatory permission to install. A VAWT would make more sense than a HAWT, in a small commercial or residential setting, because a VAWT can be placed on top of the roof of a home or building. However, because of the inefficiency of the current VAWT technology, they are difficult to economically justify.

Figure 1:
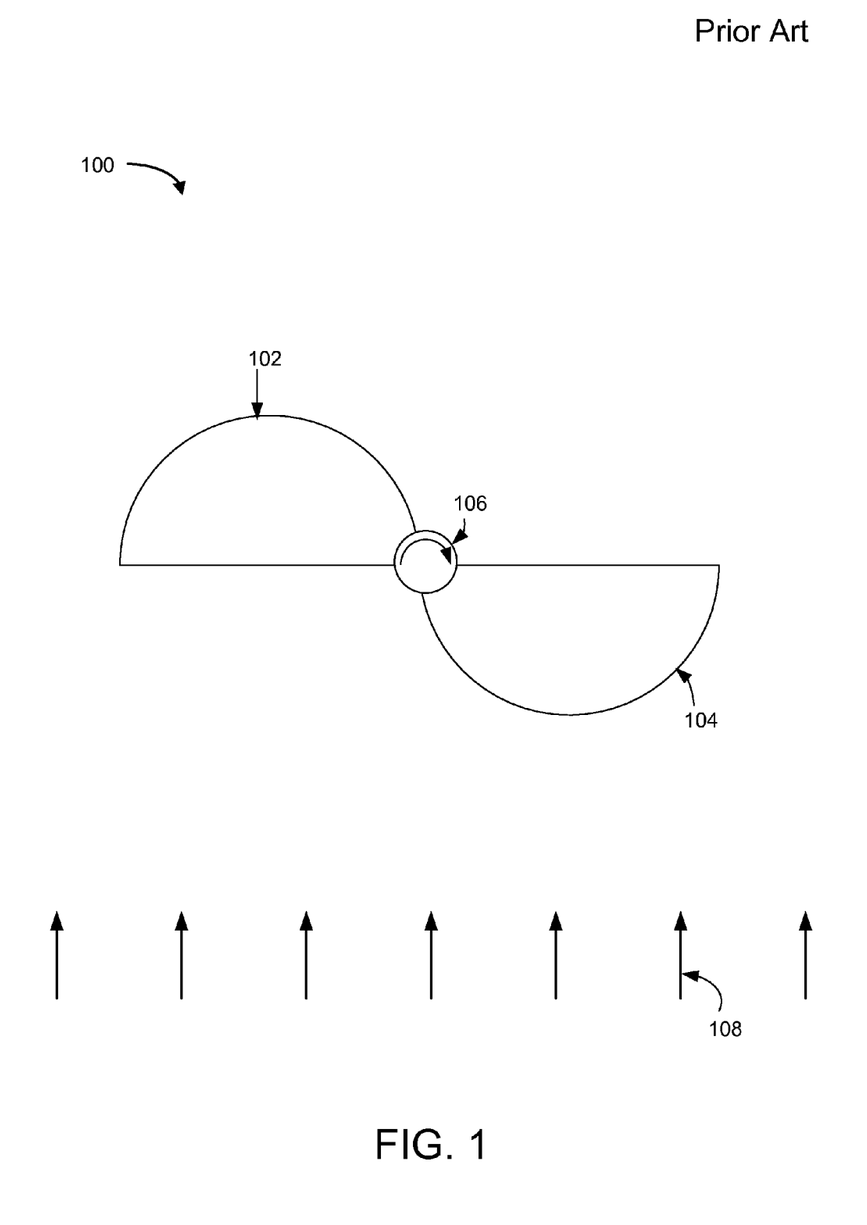
FIG. 1 depicts one embodiment of a prior art Savonius wind turbine.

FIG. 1 depicts one embodiment of a prior art Savonius wind turbine 100. While the Savonius wind turbine 100 is simple in concept, and will generate power when the wind blows, the Savonius wind turbine has a significant disadvantage. The concave section 102 of the Savonius wind turbine 100 captures the wind and creates torque in a clockwise direction. The convex side 104, however, creates a torque in the counter clockwise direction. Because the concave side 102 has more drag force than the convex side 104, the Savonius wind turbine 100 turns in a clockwise direction. While the Savonius wind turbine 100 will rotate and produce mechanical power, the drag from the convex side that moves into the wind significantly reduces the efficiency of the Savonius wind turbine 100.

Figure 2:
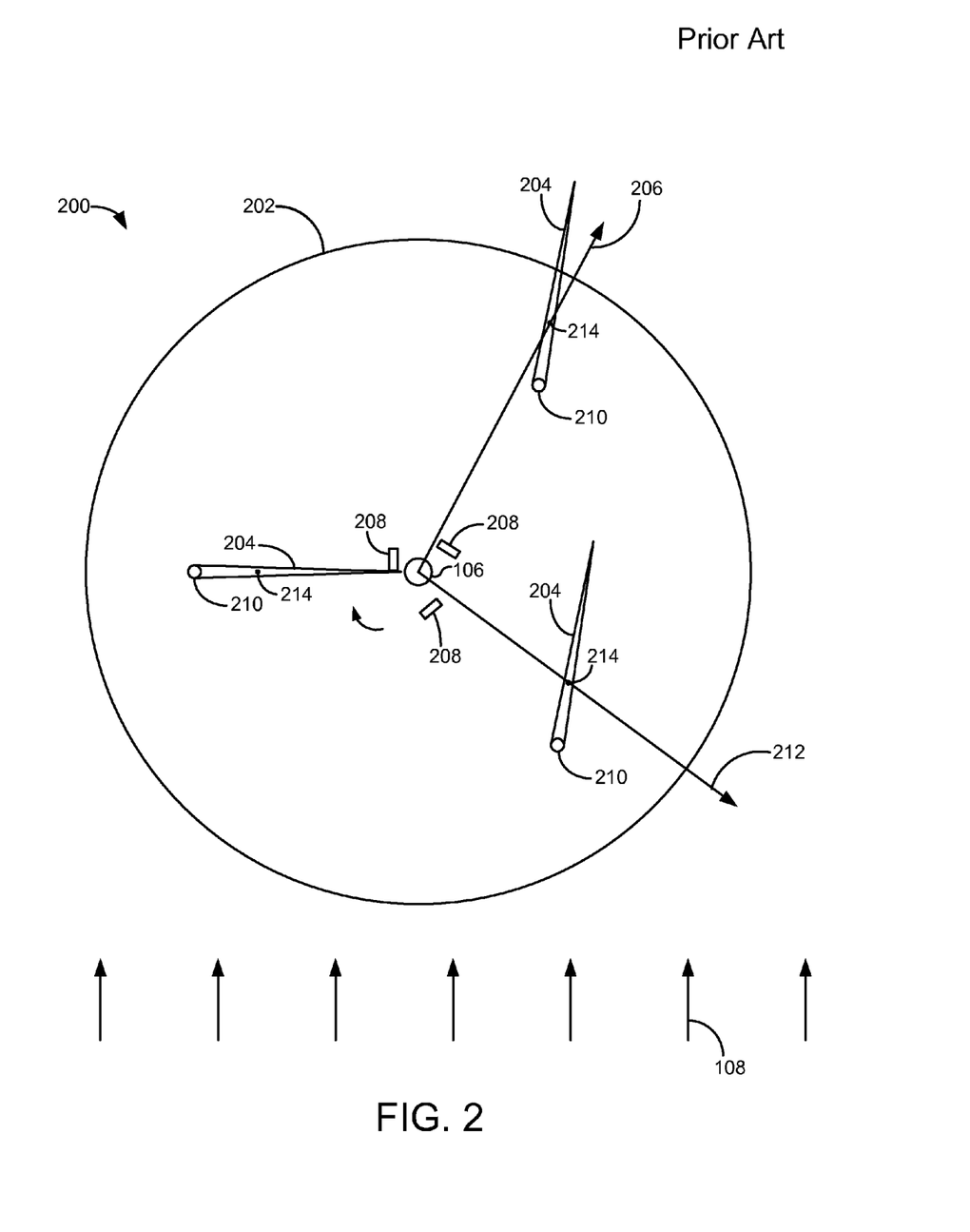
FIG. 2 depicts one embodiment of a prior art vertical axis wind turbine with vane stops.

FIG. 2 depicts one embodiment of a prior art vertical axis wind turbine 200 (VAWT) with a vane stop 208. The vane stop 208 will not allow the vanes 204 to rotate in a counter-clockwise direction when the vane shaft 210 reaches the point closest to the source of the wind 108. At this point the vane 204 contacts the vane stop 208 and is forced to turn sideways to the wind providing drag that will turn the turbine in a clockwise direction. The vane 204 in the upper right hemisphere moves into the wind 108. The vanes 204 attempt to line up with the wind 108 to reduce the drag on the side of the VAWT 200 moving into the wind 108. However, since the VAWT 200 is rotating about the turbine shaft in a clockwise direction, the upper vane 204 on the right side is subjected to centrifugal force 206 and the lower vane 204 on the right side is subjected to centrifugal force 212 that cause them to rotate outward in a clockwise direction about the vane shaft 210. The centrifugal forces 206 and 212 can be depicted as acting on the centers of mass 214 of the vanes 204. As can be seen from the drawing, the centrifugal forces 206 and 212 cause increased drag as the vanes 204 move into the wind 108 because the vanes 204 are not lined up directly into the wind 108.

SUMMARY OF THE INVENTION

Embodiments of an apparatus are described. The apparatus is a vertical axis wind turbine (VAWT) with a turbine shaft for transmitting mechanical power. Connected to the turbine shaft is a support structure with a vane connected to the support structure at a vane shaft. The vane causes the vane shaft, support structure and the turbine shaft to rotate around the center of the turbine shaft when the vane is acted upon by the wind. A centrifugal compensation rod is connected to the vane. The centrifugal compensation rod counteracts the centrifugal forces acting upon the vane as the vane rotates about the center of the turbine shaft, thereby reducing drag. Other embodiments of the apparatus are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

In one embodiment, a vertical axis wind turbine (VAWT) includes a vane 204 and a centrifugal compensation rod (CCR) 404 attached in line with the vane 204 on the opposite side of the vane shaft 210 from the vane 204. The CCR 404 is configured to counteract the centrifugal forces acting on the vanes 204. The second embodiment utilizes airfoil shaped vanes 602 that have a CCR 404 and also have a rotational activation rod (RAR) 706 that causes the vanes 204 to create a clockwise torque through lift when they are moving on the side of the turbine moving into the wind as well as creating a clockwise torque through drag on the side of the turbine moving with the wind. The third embodiment utilizes airfoil shaped vanes that have a CCR 404 and a RAR 706 and the VAWT 900 creates power through lift forces only.

The first embodiment significantly improves on the efficiency of the Savonius VAWT 100 by reducing drag because the vanes in this embodiment have a CCR and line up with the wind when they are moving into the wind, thus reducing the drag on the side of the VAWT that moves into the wind. The second embodiment improves on the power production of the first embodiment by utilizing airfoil shaped vanes that generate lift as they are moving into the wind thus creating power where the first embodiment only has counterproductive drag. The third embodiment provides power by lift forces only.

Although specific embodiments of the invention have been described and illustrated, the invention is not to be limited to the specific forms or arrangements of parts so described and illustrated. The scope of the invention is to be defined by the claims appended hereto and their equivalents.

Figure 3:
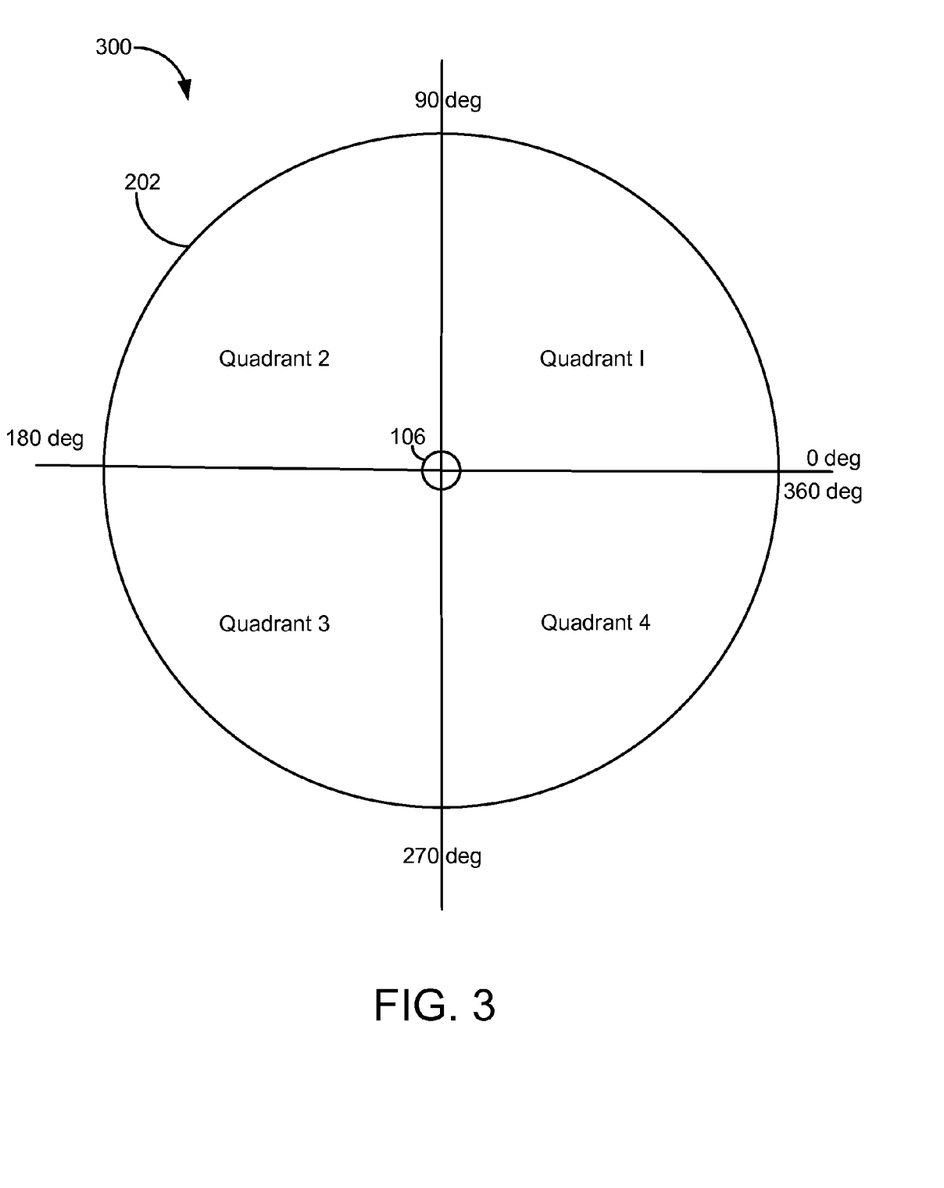
FIG. 3 depicts one embodiment of a schematic diagram of four reference quadrants.

FIG. 3 depicts one embodiment of a schematic diagram of four reference quadrants. Superimposed on a bottom plate 202 are vertical and horizontal lines that divide the VAWT 300 into four quadrants. These quadrants are designated Quadrants 1-4 and are for discussion purposes. A degree scale is also superimposed on the VAWT 300 starting with the right hand side of the VAWT 300 at zero degrees. Quadrant 1 is then defined as the section of the VAWT 300 from zero to ninety degrees. Quadrant 2 is then defined as the section of the VAWT 300 from ninety degrees to one hundred and eighty degrees, and so forth for the four quadrants, each quadrant composed of 90 degree segments. These quadrants will be used for discussion purposes as the various embodiments of the VAWT are explained.

Figure 4:
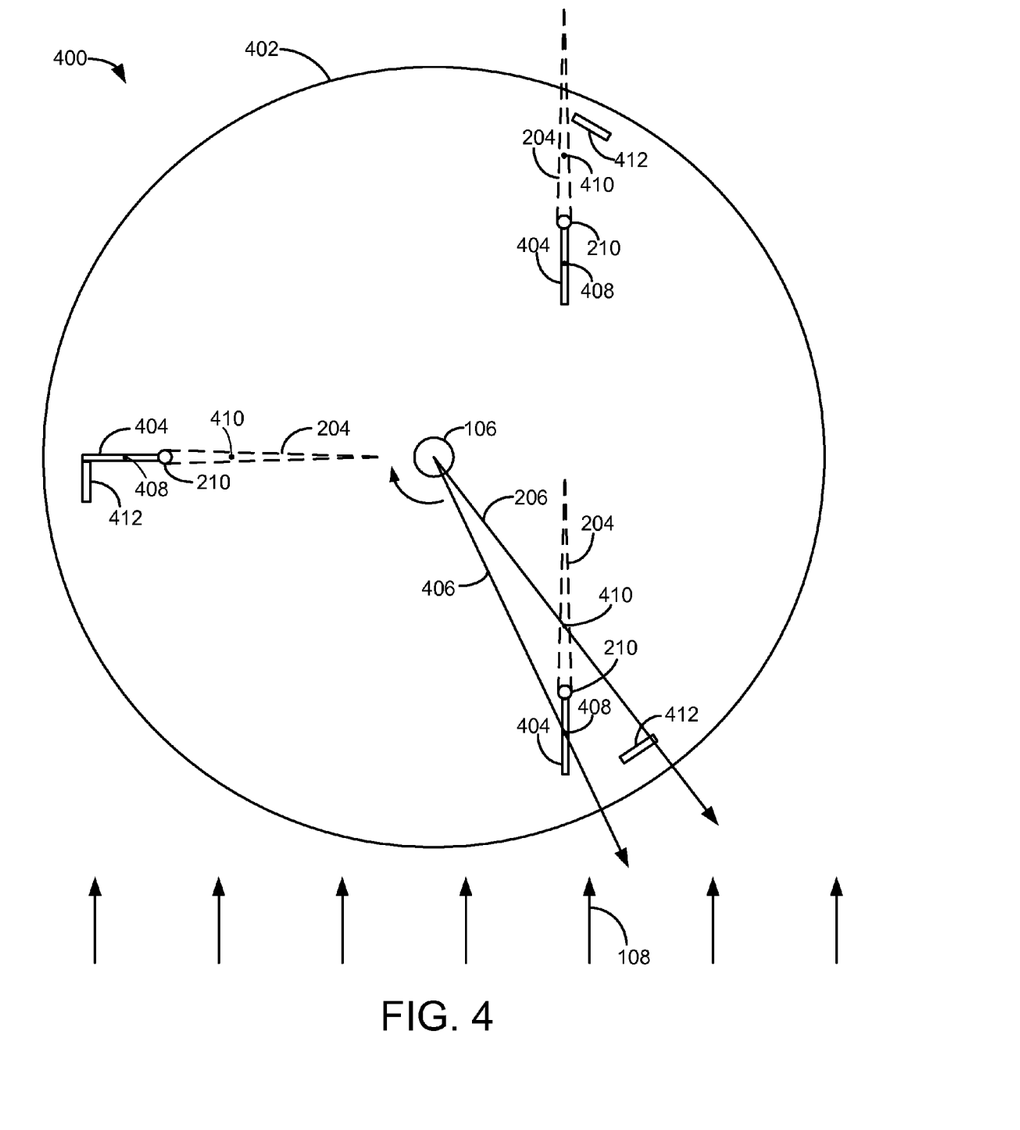
FIG. 4 depicts one embodiment of a vertical axis wind turbine with centrifugal compensation rods.

FIG. 4 depicts one embodiment of a compensated VAWT 400 (CVAWT) with a CCR 404. The apparatus is a CVAWT 400 that has a turbine shaft 106 for transmitting mechanical power. In one embodiment a support structure in the form of a top plate 402 is connected to the turbine shaft 106. In one embodiment, a bottom plate 202 (not shown in this drawing) is connected to the turbine shaft 106. A vane shaft 210 extends from the top plate 402 to the bottom plate 202 and is rotatably connected to the top plate 402 and the bottom plate 202. The vane 204 is rigidly connected to the vane shaft 210. In this embodiment a CCR 404 is connected to the vane shaft 210 in line with the vane 204. The CCR 404 produces a centrifugal force 406 that counteracts the centrifugal forces 206 acting upon the vane 204 as the vane 204 and the vane shaft 210 rotates about the center of the turbine shaft 106. The mass of the CCR 404 times the distance from the center of mass 408 of the CCR 404 to the center of the vane shaft 210 must be equal to the mass of the vane 204 times the distance from the center of mass 410 of the vane 204 to the center of the vane shaft 210. When the rotational torque created by the CCR 404 about the vane shaft 210 equals the rotational torque created by the vane 204, the centrifugal forces acting on the vane 204 will be compensated for and the vane 204 will be free to rotate about the vane shaft 210 without centrifugal forces changing the orientation of the vane 204 about the vane shaft 210. In quadrants 2 and 3, the CCR stop 412 causes the vane to move at an angle to the direction of the wind to capture drag force creating torque to rotate the CVAWT in a clockwise direction.

Because the centrifugal force 206 acting upon the vane 204 is counteracted by the centrifugal forces 406 of the CCR 404, the vane 204 is then free to line up with the direction of the wind, when moving into the wind, without any other forces affecting the orientation of the vane 204 about the vane shaft 210. The balancing of the centrifugal forces about the vane shaft 210 significantly reduces the drag as the vane 204 moves into the wind 108 through quadrants 1 and 4. Because of the lower drag of the vanes 204 when connected with a CCR 404, the efficiency of the CVAWT 400 is significantly increased.

Figure 5:
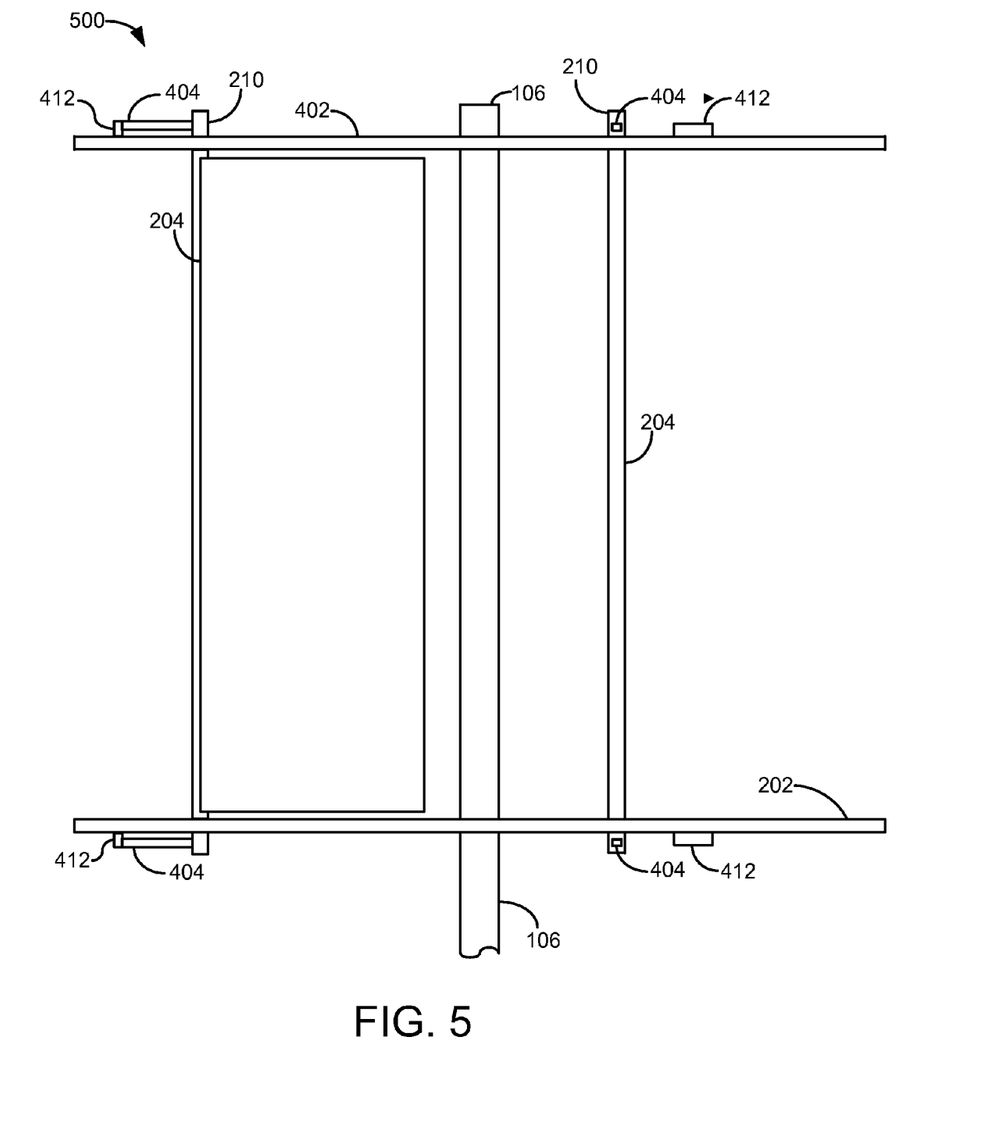
FIG. 5 depicts one embodiment of a vertical axis wind turbine with centrifugal compensation rods as viewed from the side.

FIG. 5 depicts one embodiment of a vertical axis wind turbine with CCRs 404 as viewed from the side. The side view depicts the CVAWT 400 with a top plate 402, a bottom plate 202, both plates connected to the turbine shaft 106. The vane shafts 210 extends above the top plate 402 and below the bottom plate 202. In this embodiment, the CCRs 404 are attached to the vane shafts 210 at the bottom of the vane shaft 210 and at the top of the vane shaft 210. The two CCRs 404 for each vane shaft 210 are used instead of one to reduce torque on the vane 204 with respect to the vane shaft 210. However, the two CCRs each produce one half of the rotational torque required to compensate for the rotational torque of the vane. The vanes 204 are shown in the same positions as shown in the top view of the CVAWT 400 in FIG. 4. As the drawing depicts, the left vane 204 shown in the drawing is sideways to the wind 108 and the wind 108 creates drag forces upon the vane 204 causing the CVAWT 400 to rotate and produce mechanical power. The vane 204 depicted in the right side of the drawing is lined up with the wind and has a low profile and a low drag as the vane 204 is moving into the wind which increases the efficiency of the CVAWT 400.

Figure 6:
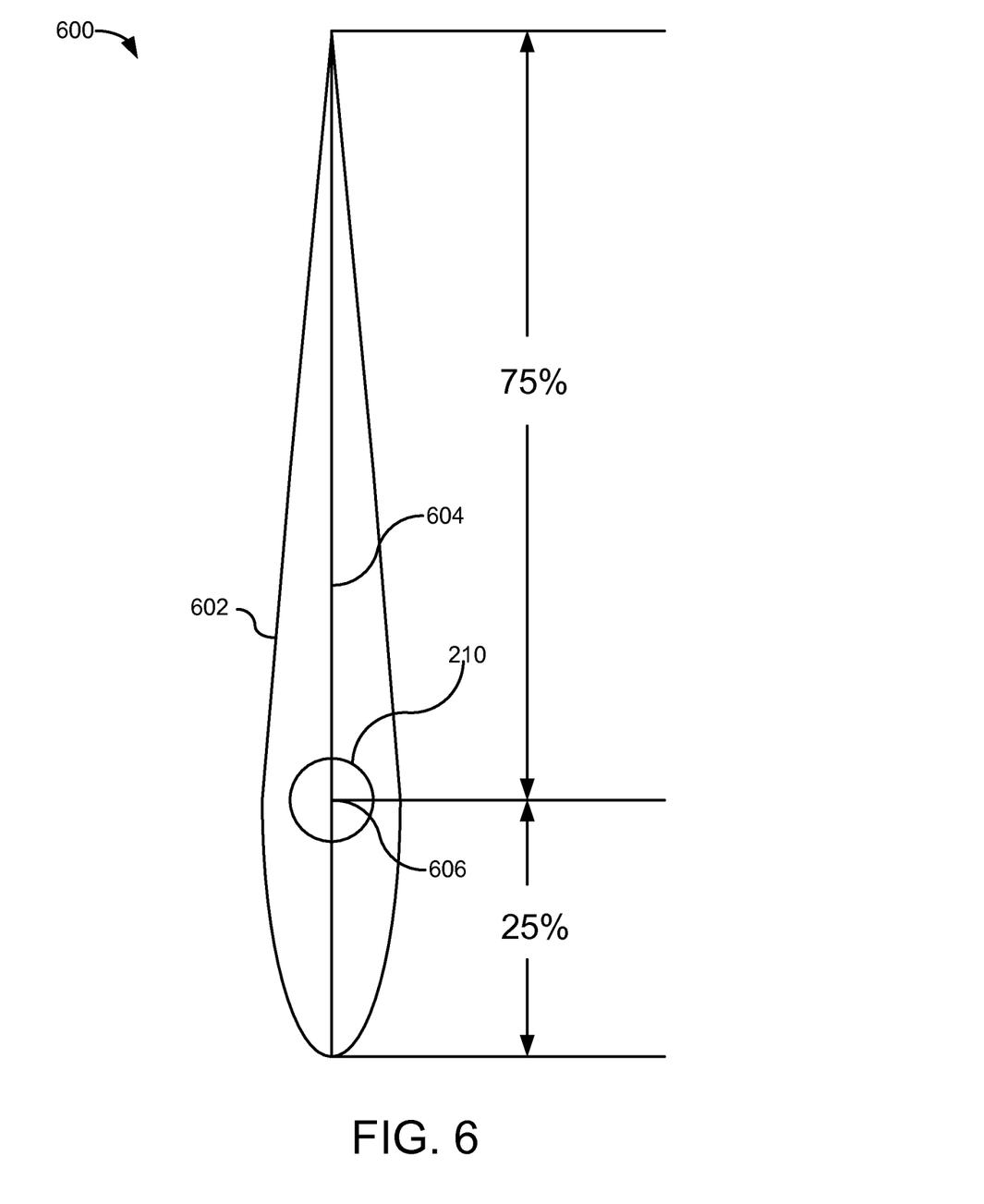
FIG. 6 depicts one embodiment of an airfoil shaped vane.

FIG. 6 depicts one embodiment of an airfoil shaped vane 602. The drawing depicts the airfoil shaped vane 602, the chord 604 of the airfoil shaped vane 602, the vane shaft 210, and the quarter chord point 606. In one embodiment, the airfoil shaped vane 602 is substantially symmetrical about the chord 604 of the airfoil shaped vane 602. A symmetrically shaped airfoil 602 has a center-of-lift which is at the quarter chord point 606. The quarter chord point 606 is approximately at a point along the chord 604 that is 25 percent of the chord-length as measured along the chord 604 from the leading edge to the trailing edge of the airfoil shaped vane 602. The vane shaft 210 is placed at the quarter chord point 606 so that the lift forces generated by the airfoil shaped vane 602 can be applied directly to the vane shaft 210 without the lift forces affecting the orientation of the airfoil shaped vane 602 around the vane shaft 210.

Figure 7:
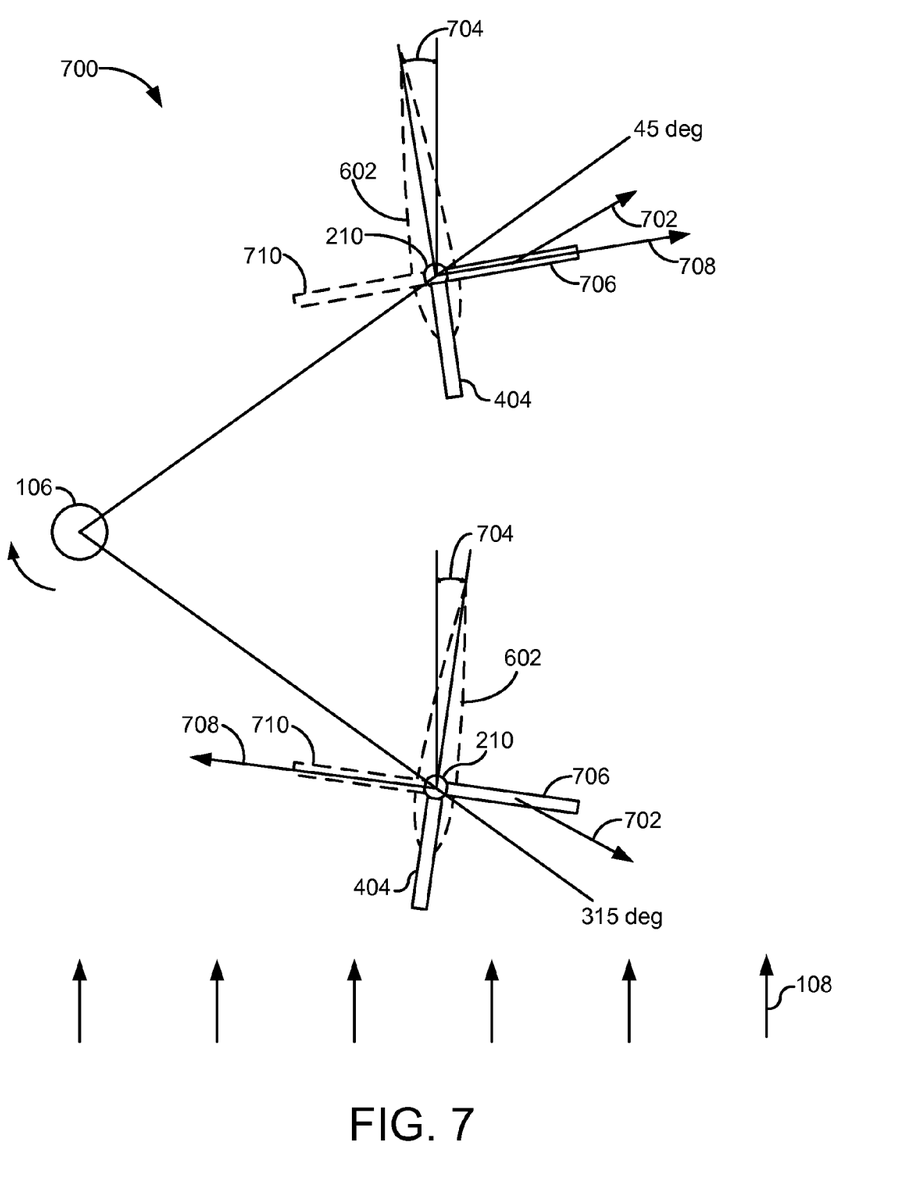
FIG. 7 depicts one embodiment of airfoil shaped vanes with centrifugal compensation rods and rotational activation rods.

FIG. 7 depicts one embodiment of a CVAWT 700 with an airfoil shaped vane 602 with a CCR 404 and a RAR 706. In one embodiment, the RAR 706 is connected to the vane 602. When a centrifugal force acts upon the RAR 706 the airfoil shaped vane 602 will rotate about the vane shaft 210 to create an angle of attack 704 with regard to the direction of the wind 108. The wind 108 causes a torque opposite the RAR torque which keeps the angle of attack 704 at an appropriate angle. In another embodiment, the RAR 710 is placed on the opposite side of the vane shaft 210. By placing the RARs 706 as depicted in the drawing, the torque created by the lift forces would be in a clockwise direction. By placing the RAR 710 on the airfoil shaped vane 602 on the opposite side of the vane shaft 210, the torque created by the lift forces 708 would be in a counterclockwise direction. The angle of attack 704 creates lift forces 708 in the directions shown for each position of the two airfoil shaped vane 602.

The angle of attack 704 of the airfoil shaped vane 602 varies with respect to the direction of the wind from 0 to approximately 25 degrees, depending on the position of the vane shaft 210 as it rotates about the center of the turbine shaft 106. The lift forces 708 on the airfoil shaped vane 602, in the first quadrant, creates clockwise torque to assist in the generating of power for the CVAWT 700. The lift forces 708 on the airfoil shaped vane 602 in the fourth quadrant also creates clockwise torque to assist in the powering of the CVAWT 700. Thus, by adding the RARs 706 to the airfoil shaped vanes, lift forces create clockwise torque in quadrants 1 and 4. Vanes 204, in quadrants 1 and 4, with the current technology would have only produced drag which counteracts the generation of clockwise torque by the CVAWT 700. The rotational compensation rod 706 can be placed in other positions around the vane shaft 210 other than the position depicted in FIG. 7. Other embodiments include having one or more CCRs 404 and/or more than one RAR 706. In one embodiment, the CVAWT 700 combines the CCR 404 with the RAR 707 to create a combination rod. The combination rod is placed in a location around the vane shaft 210 to achieve a particular characteristic for the CVAWT 700. In other words, the functions of the CCR 404 and the RAR 706 may be achieved with a single combination rod (not depicted) when placed in a particular angular location about the vane shaft.

Figure 8:
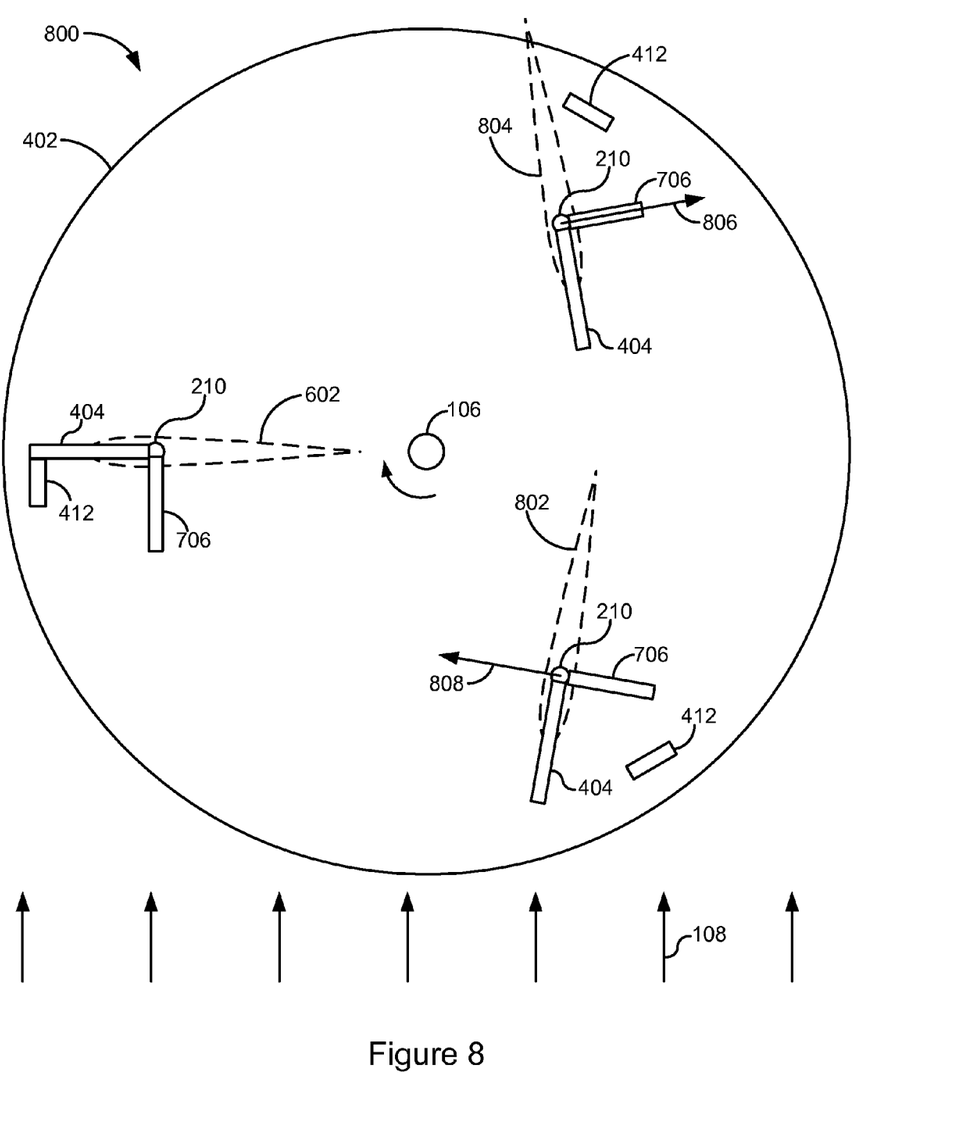
FIG. 8 depicts one embodiment of three airfoil shaped vanes with centrifugal compensation rods, rotational activation rods, and rotational activation rod stops.

FIG. 8 depicts one embodiment of an airfoil shaped vane 602 with a CCR 404, a RAR 706, and a CCR stop 412. In one embodiment, the CCR stop 412 stops the rotation of the airfoil shaped vane 602, when the airfoil shaped vane 602 rotates about the turbine shaft 210 to approximately 270 degrees minus the angle of attack 704. At approximately this point the CCR 404 contacts the CCR stop 412. The airfoil shaped vane 602 is then placed at an angle to the wind 108 and creates drag force in a clockwise direction as the wind 108 acts upon the airfoil shaped vane 602. The airfoil shaped vane 804 depicted in the first quadrant produces lift force 806 in a clockwise direction. The airfoil shaped vane 802 in the fourth quadrant produces lift force 808 in a clockwise direction.

Figure 9:
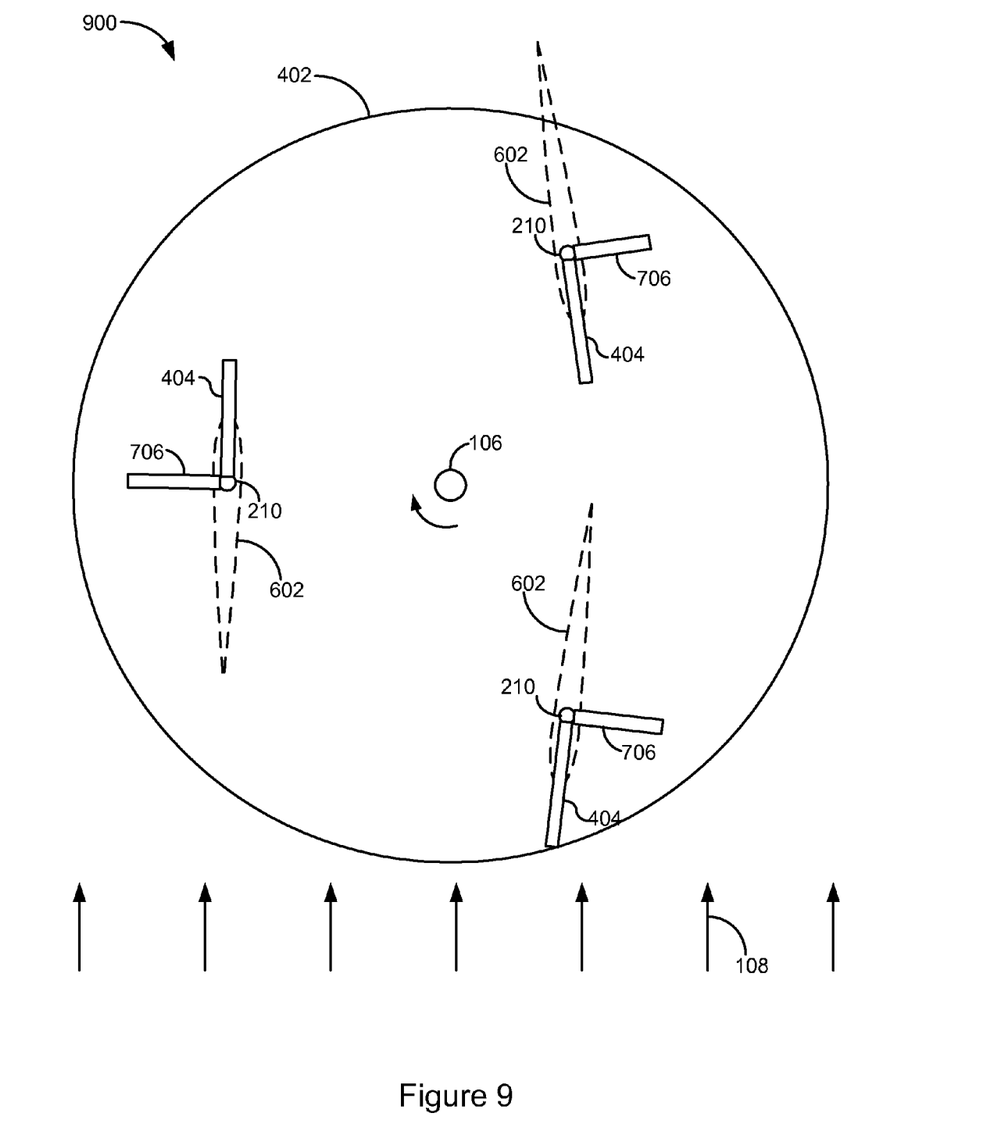
FIG. 9 depicts one embodiment of an airfoil shaped vane with a centrifugal compensation rod and a rotational activation rod, configured to generate mechanical power using lift.

FIG. 9 depicts one embodiment of an airfoil shaped vane 602 with a CCR 404 and a RAR 706, configured to generate mechanical power using lift. The CVAWT 900 shows a top plate 402 and a turbine shaft 106. Each of the airfoil shaped vanes 602 has a vane shaft 210. The CVAWT 900 shows three banks of airfoil shaped vanes 602 with one airfoil shaped vane 602 per bank. Other embodiments could have less than or more than three banks and more than one airfoil shaped vane per bank. In this embodiment the airfoil shaped vanes 602 and the vane shafts 210 are free to rotate about the center of the vane shaft 210. As an airfoil shaped vane 602 rotates about the turbine shaft 106, the CCRs counteract the centrifugal forces acting upon the airfoil shaped vane. The RARs 706, through centrifugal force, cause the airfoil shaped vanes 602 to rotate about the center of the vane shaft 210 to create an angle of attack 704 creating lift forces on the airfoil shaped vanes that generate torque in a clockwise direction around the turbine shaft 106.

Figure 10:
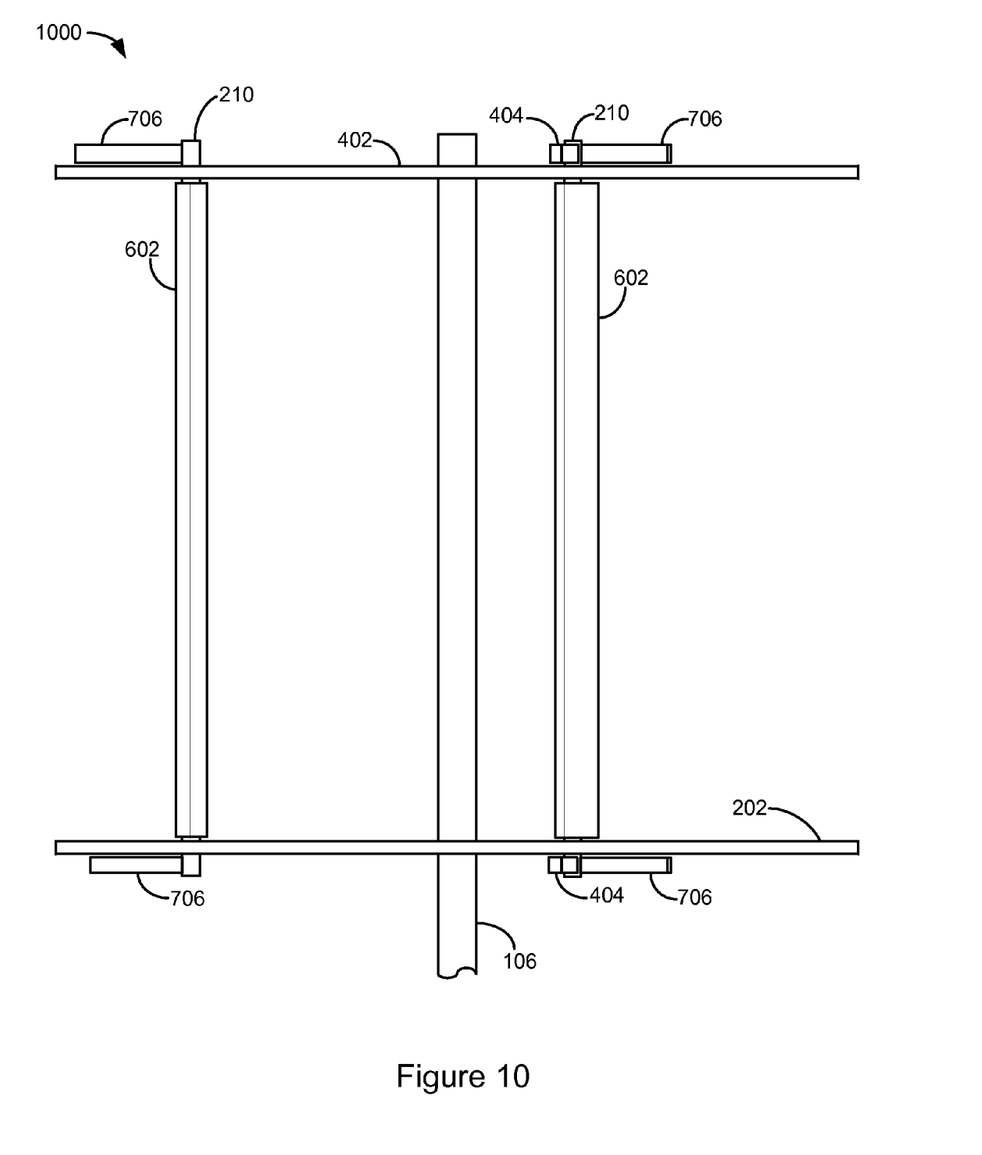
FIG. 10 depicts one embodiment of the airfoil shaped vane with centrifugal compensation rod and rotational activation rod from a side-view.

FIG. 10 depicts one embodiment of the airfoil shaped vane with CCR and RAR from a side-view. The side view shows the orientation of the airfoil shaped vanes 602, the top plate 402, the bottom plate 202, the turbine shaft 106, and the CCRs 404 and the RARs 706. The airfoil shaped vane 602 shown in the first quadrant in FIG. 9 is hidden by the airfoil shaped vane 602 in the fourth quadrant of FIG. 9.

Figure 11:
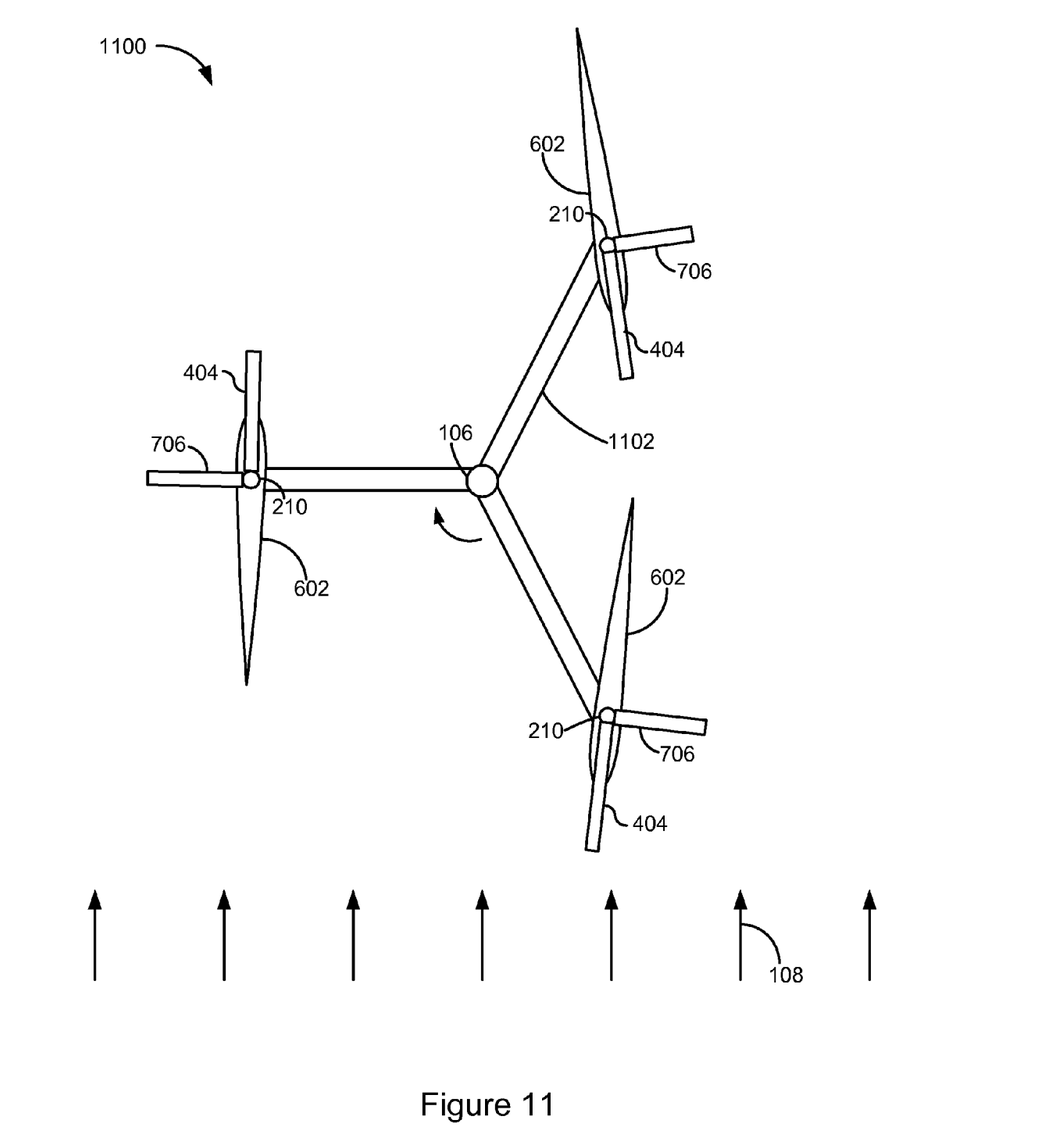
FIG. 11 depicts one embodiment of the airfoil shaped vane with centrifugal compensation rod and rotational activation rod with a support structure connected to a turbine shaft.

FIG. 11 depicts one embodiment of the airfoil shaped vane 602 with CCR 404 and RAR 706 with a support structure 1102 connected to a turbine shaft 106. The support structural 102 has vane shafts 210 connected at approximately a 90 degree orientation to the support structure 1102 which then couples to the airfoil shaped vanes 602. The CVAWT 1102 shows the airfoils shaped vanes 602 with attached CCRs 404 and RARs 706. The CVAWT 1102 is designed to rotate in a clockwise direction. It should be noted a counterclockwise direction of rotation could be attained by moving the RARs 706 to the opposite side of the vane shaft 210.

Figure 12:
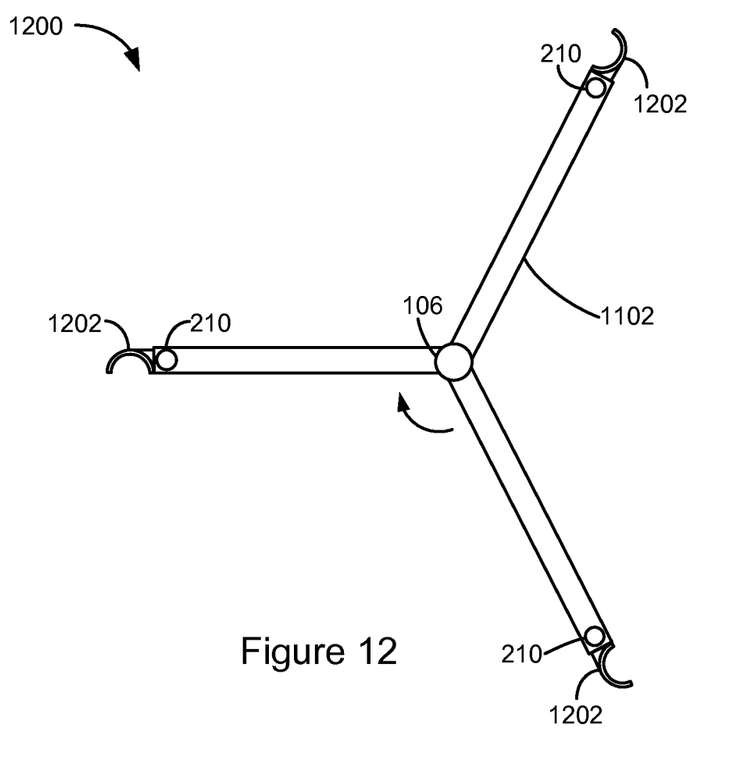
FIG. 12 depicts one embodiment of the support structure connected to the turbine shaft and savonius starter components.

FIG. 12 depicts the support structure 1102 with the vane shafts 210 and a savonius starter component 1202 connected to the ends of the support structure arms 1102. The drawing also shows the turbine shaft 106. The savonius starter component 1202 will start the turbine turning when wind 108 velocity is at a sufficient level. Since the angle of attack is created by centrifugal forces acting on the RARs 706 when the turbine is rotating, there is no angle of attack 704 to create lift forces when the CVAWT 1200 is not rotating. By placing savonius starter components 1202 on the ends of the arms of the support structure 1102, the turbine will start to rotate when there is a high enough wind speed. There are other methods that could be used to start the CVAWT 1200 besides the savonius starter components 1202 depicted.

Figure 13:
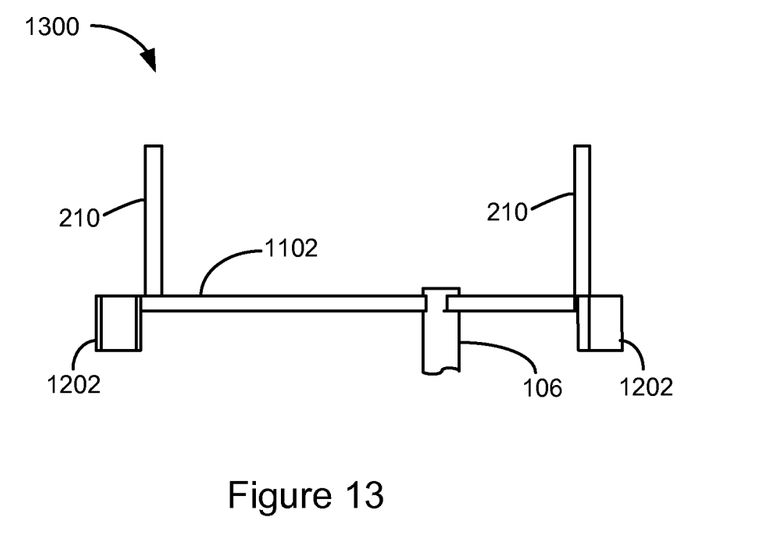
FIG. 13 depicts one embodiment of the support structure viewed from the side with the vane shafts.

FIG. 13 depicts one embodiment of the support structure 1102 viewed from the side with the vane shafts 210. The side view also shows the turbine shaft 106, and the Savonius VAWT components 1202.

Figure 14:
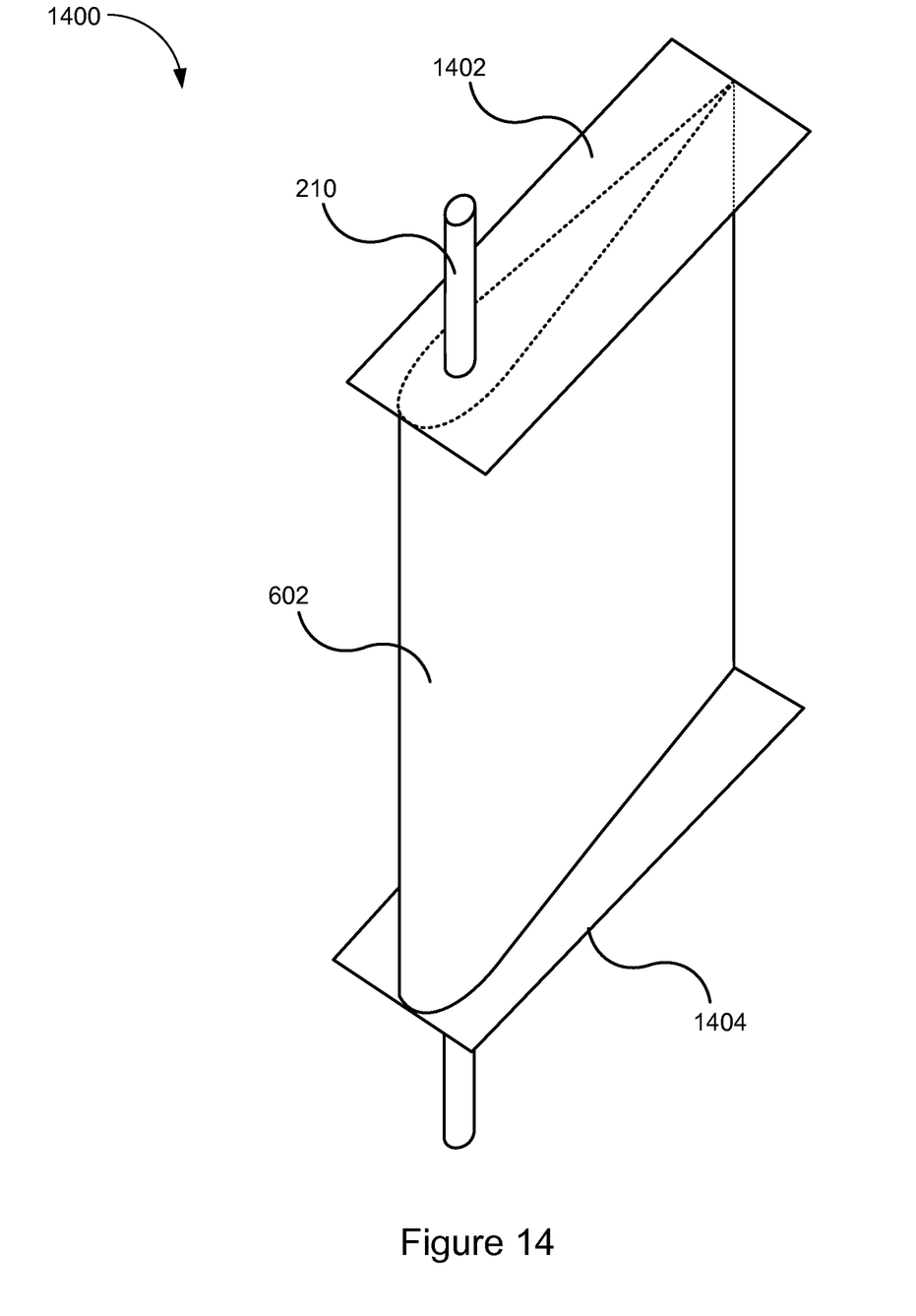
FIG. 14 depicts one embodiment of an airfoil edge airflow preventer.

FIG. 14 depicts one embodiment of an airfoil edge airflow preventer (AEAP) 1402. The AEAP 1402 is coupled to the top edge of the airfoil shaped vane 602 and there is an AEAP 1404 at the bottom edge of the airfoil shaped vane 602. When an airfoil shaped vane 602 is generating lift, the side of the airfoil shaped vane 602 that is generating lift has a reduced air pressure compared to the side of the airfoil shaped vane 602 that creates drag. The AEAP 1402 stops airflow over the airfoil shaped vane 602 edge from the high pressure side to the low pressure side of the airfoil shaped vane 602. Reducing the airflow from the high pressure side to the low pressure side prevents the edge airflow from reducing the lift on the low pressure side. A second AEAP 1404 is shown at the bottom of the airfoil shaped vane 602. Because the AEAP 1402 is parallel to the direction of the wind it produces little or no drag. The AEAP 1402 is shown in the form of a rectangle but the AEAP 1402 can take many different forms and the shape is not limited to the shape depicted in the drawing.

Figure 15:
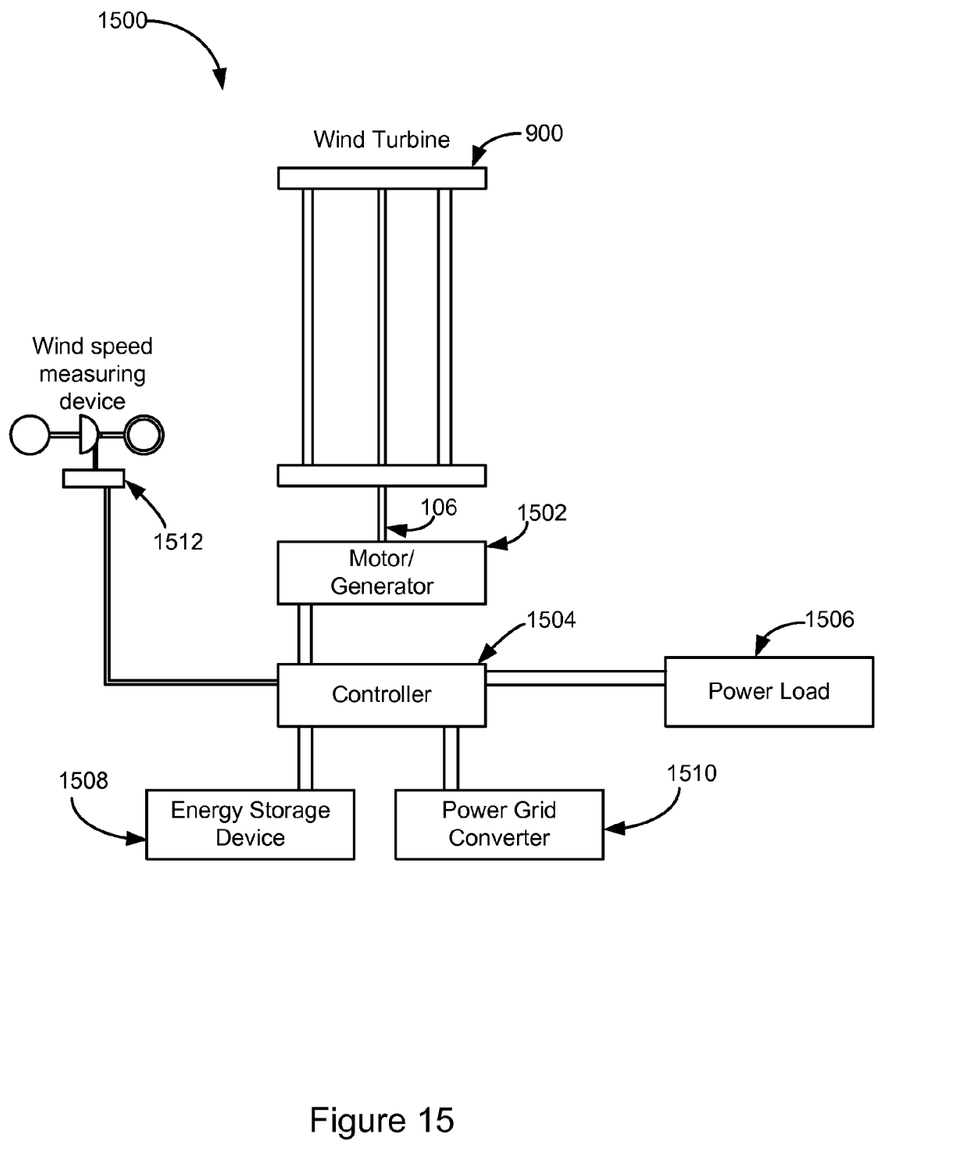
FIG. 15 depicts one embodiment of a schematic diagram of a vertical axis wind turbine system.

FIG. 15 depicts one embodiment of a schematic diagram of a vertical axis wind turbine system. The system includes a motor generator 1502, a controller 1504, an energy storage device 1508, a power grid converter 1510, and a power load 1506. The motor generator 1502 derives its mechanical power from the turbine shaft 106. The motor generator 1502 is connected to the controller 1504. The controller 1504 converts the power generated by the motor generator into an appropriate voltage to charge a energy storage device 1508.

The controller is also connected to a wind speed measuring device 1512 so that the controller can determine the speed of the wind 108. The wind speed measuring device 1512 is located approximately at the same position above the ground as the CVAWT 900.

In one embodiment, the controller extracts energy from the storage device to supply power to the motor generator to start the CVAWT 900 rotating about the center of the turbine shaft upon a determination that the wind velocity is adequate to enable power generation by the CVAWT 900. The controller will supply power to charge the energy storage device when the motor generator provides sufficient power to the controller.

The controller 1504 is connected to a commercial power grid converter 1510. The commercial power grid converter 1510 supplies power to a commercial electrical energy provider. The controller 1504 converts the power supplied by the motor generator 1502 into an appropriate form of energy to power the commercial power grid converter 1510.

The controller 1504 also supplies power to a power load 1506 that, in one embodiment, is supplied power by the controller 1504 when the motor generator 1502 is generating more power than the energy storage device 1508 and the power grid converter 1510 can utilize. An example of a power load 1506 would be a hot water heater of sufficient size to utilize any excess power generated by the CVAWT 900.

What is claimed is:

1. A vertical axis wind turbine (VAWT) comprising:
a turbine shaft to transmit mechanical power;
a support structure coupled to the turbine shaft;
a vane rotatably coupled to the support structure at a vane shaft, wherein the vane is configured to rotate the turbine shaft when the vane is acted upon by a wind; a centrifugal compensation rod (CCR) coupled to the vane, wherein the CCR is configured to counteract a centrifugal force on the vane as the vane rotates about the center of the turbine shaft; and
a rotational activation rod (RAR) coupled to the vane, wherein the RAR is configured to create a torque on the vane.

2. The VAWT of claim 1, further comprising a CCR stop, the CCR stop configured to contact the CCR at a certain angle about the vane shaft.

3. The VAWT of claim 1, further comprising a rotational activation rod (RAR) coupled to the vane shaft, wherein the RAR is configured to create a torque on the vane, wherein the result of the torque on the vane from the RAR and the torque on the vane from the wind creates an angle of attack with respect to the direction of the wind that creates a lift force on the vane.

4. The VAWT of claim 1, wherein the vane is configured as an airfoil shaped vane.

5. The VAWT of claim 4, wherein the vane shaft of the airfoil shaped vane is located near a quarter chord point on a chord of the airfoil shaped vane, wherein the quarter chord point is located at approximately 25% of the chord length of the airfoil shaped vane measured from the leading edge of the airfoil shaped vane.

6. The VAWT of claim 5, wherein the airfoil shaped vane is substantially symmetrical about the chord of the airfoil shaped vane.

7. The VAWT of claim 1, further comprising a savonius starter coupled to the support structure, the savonius starter configured to start the rotation of the VAWT.

8. The VAWT of claim 1, further comprising an airfoil edge airflow preventer (AEAP) coupled to the airfoil shaped vane, the AEAP to prevent the flow of air from a high-pressure side of the vane to a low-pressure side of the vane at the edge of the airfoil shaped vane.

9. The VAWT of claim 1, wherein the support structure comprises:
a top plate coupled to the turbine shaft; and
a bottom plate also coupled to the turbine shaft, wherein the vane shaft extends between the top and the bottom plate.

10. A system comprising:
a motor generator to generate power;
a controller coupled to the motor generator to control the operation of the motor generator; and
a vertical axis wind turbine (VAWT) coupled to the motor generator to transmit mechanical power to the motor generator, the VAWT comprising:
a turbine shaft to rotate a power-generating element of the motor generator;
a support structure coupled to the turbine shaft;
a vane rotatably coupled to the support structure at a vane shaft, wherein the vane is configured to rotate the turbine shaft in response to a wind blowing upon the vane; a centrifugal compensation rod (CCR) coupled to the vane, wherein the CCR is configured to counteract a centrifugal force on the vane as the vane rotates about the center of the turbine shaft; and
a rotational activation rod (RAR) coupled to the vane, wherein the RAR is configured to create a torque on the vane.

11. The system of claim 10, further comprising a rotational activation rod (RAR) coupled to the vane shaft, wherein the RAR is configured to create a torque on the vane shaft, wherein the result of the torque on the vane shaft from the RAR and the torque on the vane shaft from the wind creates an angle of attack with respect to the direction of the wind that creates a lift force on the vane.

12. The system of claim 10, wherein the vane is configured as an airfoil shaped vane.

13. The system of claim 10, further comprising a CCR stop, the CCR stop configured to contact the CCR at a certain angle about the vane shaft.

14. The system of claim 10, wherein the controller extracts power from the motor generator to prevent the VAWT from exceeding a design rotational speed.

15. The system of claim 10, further comprising:
a wind speed measuring device coupled to the controller to measure the speed of the wind upon the vane;
an energy storage device coupled to the controller to store energy generated by the motor generator;
a power grid converter coupled to the controller to convert power generated by the motor generator for a commercial power grid; and
a power load device coupled to the controller to offload power generated by the motor generator.

16. The system of claim 15, wherein the controller is further configured to generate a rotation signal in response to a detection of a threshold wind speed by the wind speed measuring device, wherein the motor generator rotates the turbine shaft in response to a receipt of the rotation signal from the controller.

17. A method comprising:
transmitting, via a turbine shaft, mechanical power, wherein the turbine shaft connects to a support structure;
connecting a vane to the support structure at a vane shaft;
rotating, via the vane, the turbine shaft in response to a wind blowing upon the vane;
placing a centrifugal compensation rod (CCR) on the vane shaft;
counteracting, via the CCR, a centrifugal force on the vane as the vane rotates about the turbine shaft, wherein the vane is rotatably coupled to the vane shaft;
connecting a rotational activation rod (RAR) to the vane; and
creating, via the RAR, a torque on the vane.

18. The method of claim 17, further comprising shaping the vane into an airfoil shape vane.

19. The method of claim 17, further comprising:
creating a second torque on the vane in addition to a first torque on the vane created by a wind;
creating an angle of attack with the vane with respect to a direction of the wind based on the first and second torques; and
creating a lift force on the vane based on the angle of attack.

20. The method of claim 17, further comprising:
placing a CCR stop on a support structure; and
stopping the rotation of the vane at a certain angle about the vane shaft in response to the CCR contacting the CCR stop.

* * * * *